United States Patent
Chen

(10) Patent No.: US 9,762,745 B2
(45) Date of Patent: Sep. 12, 2017

(54) PROTOCOL FOR BILLING TELECOMMUNICATION SERVICES BETWEEN NETWORK OPERATORS

(71) Applicant: Deutsche Telekom AG, Bonn (DE)

(72) Inventor: Yuemei Chen, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/398,492

(22) PCT Filed: Apr. 15, 2013

(86) PCT No.: PCT/EP2013/001097
§ 371 (c)(1),
(2) Date: Nov. 3, 2014

(87) PCT Pub. No.: WO2013/164065
PCT Pub. Date: Nov. 7, 2013

(65) Prior Publication Data
US 2015/0087261 A1    Mar. 26, 2015

(30) Foreign Application Priority Data
May 2, 2012    (DE) .................. 10 2012 008 517

(51) Int. Cl.
*H04M 15/00* (2006.01)
*H04L 12/14* (2006.01)
*H04W 4/24* (2009.01)

(52) U.S. Cl.
CPC ........ *H04M 15/61* (2013.01); *H04L 12/1446* (2013.01); *H04W 4/24* (2013.01); *H04M 15/50* (2013.01)

(58) Field of Classification Search
CPC ... H04M 15/61; H04M 15/50; H04L 12/1446; H04W 4/24
See application file for complete search history.

(56) References Cited

U.S. PATENT DOCUMENTS 7,092,696 B1    8/2006    Hosain et al.
2003/0120594 A1*    6/2003    Shaginaw ............ G06Q 20/102
705/40

(Continued)

FOREIGN PATENT DOCUMENTS

CN    101072276 A    11/2007
CN    101132298 A    2/2008
WO    WO 03049351 A2    6/2003

OTHER PUBLICATIONS

"Wireless Radio Telecommunication Intersystem Non-Signaling Data Communication DMH (DataMessage Handler)", 3GPP2 Standard, 3rd Generation Partnership Project 2, vol. TSGX, No. v2.0, Aug. 24, 2006, pp. 1-894.

(Continued)

*Primary Examiner* — Lester Kincaid
*Assistant Examiner* — William Wang
(74) *Attorney, Agent, or Firm* — Leydig, Voit & Mayer, Ltd.

(57) ABSTRACT

A method for automatically generating service usage information in a telecommunication network, wherein the service usage information relates to a group of telecommunication transmission devices requesting a plurality of different types of telecommunication services on the telecommunication network, includes: for each request event of a telecommunication service of a telecommunication transmission device of the group of telecommunication transmission devices requested on the telecommunication network, generating an entry of the service usage information, wherein at least one type of the plurality of different types of telecommunication services is associated with each entry; and generating an aggregate entry, wherein the aggregate entry relates to the entries of the service usage information, and wherein the aggregate entry comprises aggregate information on each (Continued)

type of the plurality of different types of telecommunication services.

5 Claims, 2 Drawing Sheets

(56) References Cited

U.S. PATENT DOCUMENTS

| | | |
|---|---|---|
| 2004/0203750 A1 | 10/2004 | Cowdrey et al. |
| 2006/0153074 A1 | 7/2006 | Hurtta et al. |
| 2008/0293409 A1 | 11/2008 | Gillot et al. |
| 2012/0058746 A1* | 3/2012 | Braunecker ........... H04M 15/00 455/414.1 |

OTHER PUBLICATIONS

Ofrane, et al., "Introduction to Telecom Billing, Usage Events, Call Detail Records, and Billing Cycles", Introduction to Telecom Billing, Jan. 1, 2004, pp. 26-27.
Charging and accounting in the international land mobile telephone service (provided via cellular radio systems), ITU-T Standard, International Telecommunication Union, Jan. 23, 2009, pp. 1-22.
"TAP3.12 Format Specification—Version 31.2", GSMA, May 23, 2013, pp. 1-288.

* cited by examiner

PROTOCOL FOR BILLING TELECOMMUNICATION SERVICES BETWEEN NETWORK OPERATORS

CROSS-REFERENCE TO RELATED APPLICATIONS

This application is a U.S. National Phase application under 35 U.S.C. §371 of International Application No. PCT/EP2013/001097, filed on Apr. 15, 2013, and claims benefit to German Patent Application No. DE 10 2012 008 517.6, filed on May 2, 2012. The International Application was published in German on Nov. 7, 2013 as WO 2013/164065 under PCT Article 21(2).

FIELD

The invention relates to a method for generating service usage information in a telecommunication network. The invention also relates to a method for transferring and/or exchanging service usage information between a telecommunication network and another telecommunication network.

The invention also relates to a telecommunication network for generating service usage information.

BACKGROUND

Conventional methods for generating service usage information exist. For example, for the purpose of providing telecommunication services, particularly using mobile communication networks, service usage information is generated that is used, in particular, for the transfer and/or exchange between different telecommunication networks or their operators. For example, in the event that a mobile telecommunication transmission device requests a telecommunication service from a telecommunication network, particularly a mobile telecommunication network, that is not its home telecommunication network—for example when there is a lack of availability or network coverage from the home telecommunication network or if the telecommunication transmission device is abroad (in relation to its home telecommunication network—service user information is produced by the telecommunication network and provided to be forwarded on to the home telecommunication network of the telecommunication transmission device, particularly for the purpose of billing.

So-called TAP (Transferred Account Procedure) files are used which, alongside a portion relating to service user information, also comprise charging information.

In particular, this charging information comprises information relating to the type of requested telecommunication service (for example, whether it concerns an international or a national call) and also information as to how high the costs are for the telecommunication service or with which discounts or volume agreements calculations are to be made.

The generation of the charging information involves network elements of the telecommunication network that do not provide the telecommunication service to the telecommunication transmission device but simply determine and collect correct charging data.

The effort involved in producing conventional service usage information has proved to be enormous, which means correspondingly high costs, in particular because different formats of the TAP files concerned are used and must be converted accordingly, in particular between the operators of different telecommunication networks. This means, for example, that, between the operator of a first telecommunication network and the operator of a second telecommunication network, the TAP data formats are converted to the operator's own format that is used in each case.

In addition, it is usually the case that the conventional generation of the service usage information takes place with a relatively large delay, i.e. several days can pass between, on the one hand, the time the telecommunication service is used by the telecommunication transmission device or the telecommunication service is provided by the telecommunication network and, on the other hand, the time the service usage information is compiled in the form that was customary hitherto.

SUMMARY

In an embodiment, the present invention provides a method for generating service usage information in a telecommunication network. The service usage information relates to a group of telecommunication transmission devices requesting a plurality of different types of telecommunication services on the telecommunication network. The method includes: automatically generating the service usage information, wherein automatically generating the service usage information includes: for each request event of a telecommunication service of a telecommunication transmission device of the group of telecommunication transmission devices requested on the telecommunication network, generating an entry of the service usage information, wherein at least one type of the plurality of different types of telecommunication services is associated with each entry; and generating an aggregate entry, wherein the aggregate entry relates to the entries of the service usage information, and wherein the aggregate entry comprises aggregate information on each type of the plurality of different types of telecommunication services.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
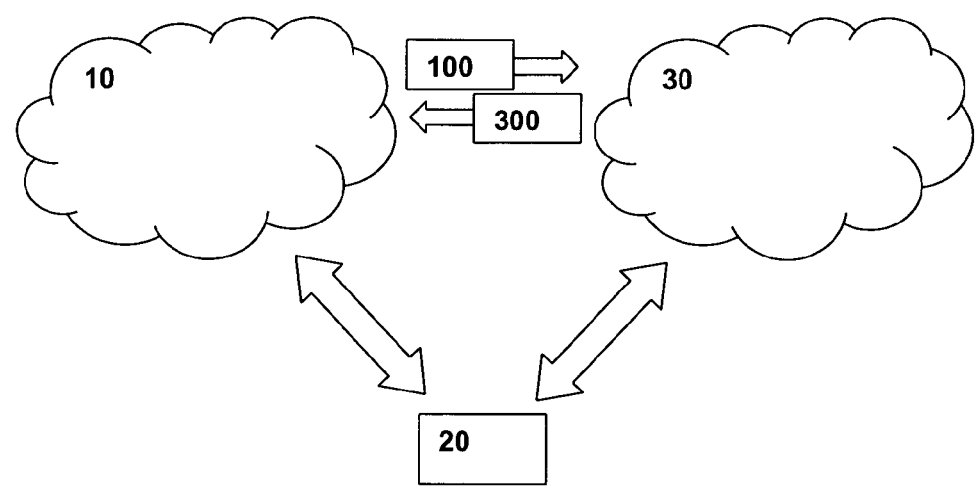
FIG. 1 shows in schematic form a telecommunication network, another telecommunication network and a telecommunication transmission device.

In an embodiment, the invention provides a method for generating service usage data which allows said service usage data to be produced more simply, straightforwardly and quickly, and the processing thereof to take place more effectively.

In an embodiment, the invention provides a method for generating service usage information in a telecommunication network, wherein the service usage information relates to a group of telecommunication transmission devices requesting a plurality of different types of telecommunication services on the telecommunication network, wherein the service usage information is automatically generated so that, for each request event of a telecommunication service of a telecommunication transmission device of the group of telecommunication transmission devices requested on the telecommunication network, an entry of the service usage information is generated, wherein at least one type of the plurality of different types of telecommunication services is associated with each entry.

According to the present invention it is thus advantageously possible for the generation of the service usage information in the telecommunication network to take place much more quickly and more promptly (in relation to the provision of the corresponding telecommunication service).

According to the invention, it is preferred that the service usage information is generated in relation to just one group of telecommunication transmission devices, for example a group of telecommunication transmission devices that are associated with a specific home telecommunication network. For other telecommunication transmission devices (i.e. those that are associated with another home telecommunication network), other service usage information is then generated by the telecommunication network.

According to the invention, it is also preferred that the generation of the service usage information is provided so that, in addition to the entries established for each request event of a telecommunication service requested in the telecommunication network, an aggregate entry is generated, wherein the aggregate entry relates to all the entries of the service usage information and wherein the aggregate entry comprises aggregate information, in particular quantity information, on each type of the plurality of different types of telecommunication services.

According to the invention, this makes it possible in an advantageous manner that, in a separate specification of the entries of the service usage information established for individual telecommunication services, the aggregate entry is generated so that the totality of the content of the service usage information relating to the telecommunication services can be used straightforwardly and in relation to one type of telecommunication service in each case According to the present invention, it is particularly preferred that the generation of the entries of the service usage information incorporates those network elements of the telecommunication network that are involved in the provision of the telecommunication services.

According to the invention, this makes it possible in an advantageous manner for the necessary information on the telecommunication services which underlies the generation of the of the service usage information to be directly available, which means that the service usage information can be generated in a timely manner.

According to the invention, it is also particularly preferred that, for the generation of the aggregate entry of the service usage information, aggregate entry generation systems of the telecommunication network that are provided within the telecommunication network for the billing of telecommunication services are involved.

According to the invention, this makes it possible in an advantageous manner for delays that may occur during the generation of service usage information because network elements of the telecommunication network are involved in the billing of telecommunication services to be avoided.

According to the invention, this makes it possible, in particular, for the method of generating service usage information to be considerably simplified. In particular, according to the invention, it is provided that the network elements provided within the telecommunication network for the billing of telecommunication services simply forward on or, at most, reformat the entries (generated by the network elements involved in the provision of the telecommunication services) of the service usage information, but do not process them extensively and in a time-consuming manner, to the extent that further, additional information—especially as regards the financial value of the use of individual telecommunication services—is produced or added to the individual entries.

The present invention also relates to a method for transferring and/or exchanging service usage information between a telecommunication network and another telecommunication network, characterised in that the service usage information relates to a group of telecommunication transmission devices requesting a plurality of different types of telecommunication services on the telecommunication network, wherein the service usage information is automatically generated so that, for each request event of a telecommunication service of a telecommunication transmission device of the group of telecommunication transmission devices requested on the telecommunication network, an entry of the service usage information is generated, wherein at least one type of the plurality of different types of telecommunication services is associated with each entry, wherein, following the generation of the service usage information, the service usage information is automatically transferred to the other telecommunication network.

According to the invention, this makes it possible in an advantageous manner for the exchange of the service usage information between the telecommunication network and the other telecommunication network to take place in a straightforward and timely manner.

Also, with regard to the inventive method for transferring and/or exchanging service usage information, according to the invention it is preferred that:
   the generation of the entries of the service usage information incorporates those network elements of the telecommunication network that are involved in the provision of the telecommunication services;
   for the generation of the aggregate entry of the service usage information aggregate entry generation systems of the telecommunication network are involved, which are provided within the telecommunication network for the billing of telecommunication services; and
   the generation of the service usage information is provided so that, in addition to the entries established for each request event of a telecommunication service requested in the telecommunication network, an aggregate entry is generated, wherein the aggregate entry relates to all the entries of the service usage information and wherein the aggregate entry comprises aggregate information on each type of the plurality of different types of telecommunication services.

Furthermore, according to the invention, it is preferably provided that further processing of the service usage information by the other telecommunication network by automated means on the basis of the aggregate entry is provided.

According to the invention, this makes it possible in an advantageous manner for the generation and processing of the service usage information to be carried out simply and in a timely manner—in contrast to conventional systems.

The present invention also relates to a telecommunication network for the generation of service usage information, wherein the service usage information relates to a group of telecommunication transmission devices requesting a plurality of different types of telecommunication services on the telecommunication network, wherein the telecommunication network is provided that automatically generates service usage information so that, for each request event of a telecommunication service of a telecommunication transmission device of the group of telecommunication transmission devices requested on the telecommunication network, an entry of the service usage information is generated, wherein at least one type of the plurality of different types of telecommunication services is associated with each entry.

According to the invention, it is preferred that the telecommunication network for the generation of the service usage information is provided so that, in addition to the entries established for each request event of a telecommunication service requested in the telecommunication network, an aggregate entry is generated, wherein the aggregate entry relates to all the entries and wherein the aggregate entry comprises aggregate information on each type of the plurality of different types of telecommunication services of the service usage information.

The present invention also relates to a computer program with program code means enabling all steps of the inventive method to be carried out if the computer program is executed on a programmable device or a network element of a telecommunication network.

Furthermore, the subject-matter of the present invention is a computer program product with a computer-readable medium and a computer program with program code means stored on the computer-readable medium enabling all steps of the inventive method to be carried out if the computer program is executed on a programmable device or a network element of a telecommunication network.

Other details, characteristics and advantages of the invention derive from the drawings as well as the following description of preferred embodiments using the drawings. The drawings illustrate the embodiments of the invention only by way of example which do not restrict the essential inventive concept.

In the different figures, the same parts are provided with the same reference signs.

FIG. 1 shows in schematic form a first telecommunication network (10), another telecommunication network (30) and a telecommunication transmission device (20). In accordance with the present invention, the telecommunication transmission device (20) is preferably a mobile communication device and the telecommunication network (10) as well as the other telecommunication network (30) are preferably mobile communication networks. The telecommunication network (10) (and/or the other telecommunication network (30)) can, according to the invention, particularly be provided such that, in addition to segments of a WAN (Wide Area Network), network segments—if appropriate, also in specific parts of the telecommunication network only—are available, which form a WLAN (Wireless Local Area Network) or a WiFi network or parts thereof.

In a roaming situation, i.e. in a situation in which the telecommunication transmission device (20) is unable to establish radio contact with the home telecommunication network with which it is associated (particularly because of a contractual relation between the user of the telecommunication transmission device (20) and the operator of a telecommunication network), a connection (from the point of view of the telecommunication transmission device) with a foreign telecommunication network is established, wherein—in the event that telecommunication services are requested by the telecommunication transmission device— service usage information has to be exchanged between the telecommunication networks involved.

In FIG. 1 this is shown in schematic form by the fact that, for example, the other telecommunication network (30) corresponds to the home telecommunication network of the telecommunication transmission device (20) and the telecommunication network (10) corresponds in this usage situation to the foreign telecommunication network. In the event that the telecommunication network (10) provides a telecommunication service for the telecommunication transmission device (20), relevant service usage information (100) is generated by the telecommunication network (10) and transferred to the other telecommunication network (30) or exchanged with the other telecommunication network (30). Conversely, in the event that the other telecommunication network (30) (with regard to a telecommunication transmission device (not shown)) provides a telecommunication service for the telecommunication network (10), relevant other service usage information (300) is generated by the other telecommunication network (30) or exchanged with the telecommunication network (10).

Figure 2:
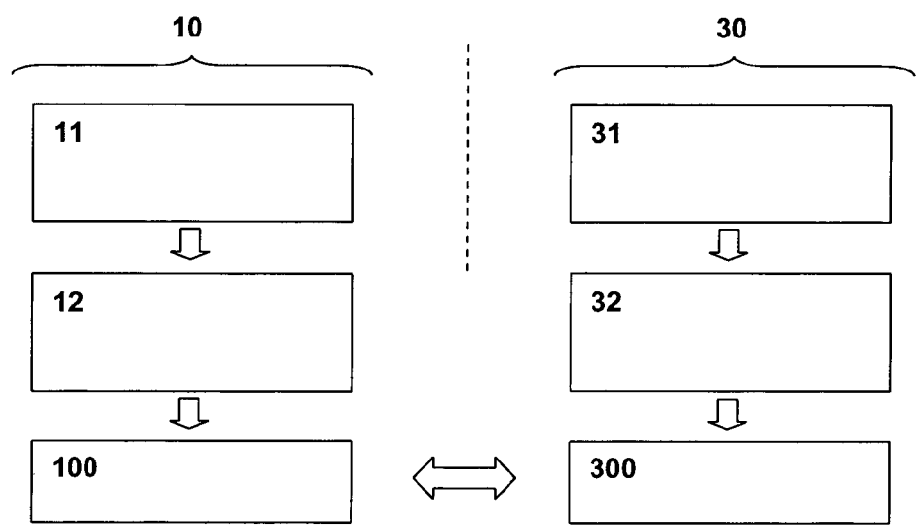
FIG. 2 shows in schematic form an example of an exchange or transfer of service usage information between a telecommunication network and another telecommunication network.

FIG. 2 shows in schematic form the exchange or the transfer of service usage information (100) between the telecommunication network (10) and the other telecommunication network (30) in accordance with the present invention.

The telecommunication network (10) comprises network elements (11), which are involved in the provision of the telecommunication service. Accordingly, the other telecommunication network (30) comprises such (other) network elements (31) which are involved in the provision of the telecommunication service. Such network elements (11) of the telecommunication network (10) or such network elements (31) of the other telecommunication network (30) comprise, for example, the following network elements (of the respective telecommunication networks):

MSC (Mobile Switching Center),
SMSC (Short Message Service Center),
SGSN (Serving GPRS Support Node),
GGSN (Gateway GPRS Support Node),
MMSC (Multimedia Messaging Service Center),
PCSCF (Proxy Call Session Control Function),
IMS (IP (Internet Protocol) Multimedia Subsystem),
WLAN (Wireless Local Area Network)/WiFi network elements.

The telecommunication network (10) also comprises aggregate entry generation systems (12), which are provided within the telecommunication network (10) for the billing of telecommunication services. Accordingly, the other telecommunication network (30) also comprises other aggregate entry generation systems (32), which are provided within the other telecommunication network (30) for the billing of telecommunication services.

Figure 3:
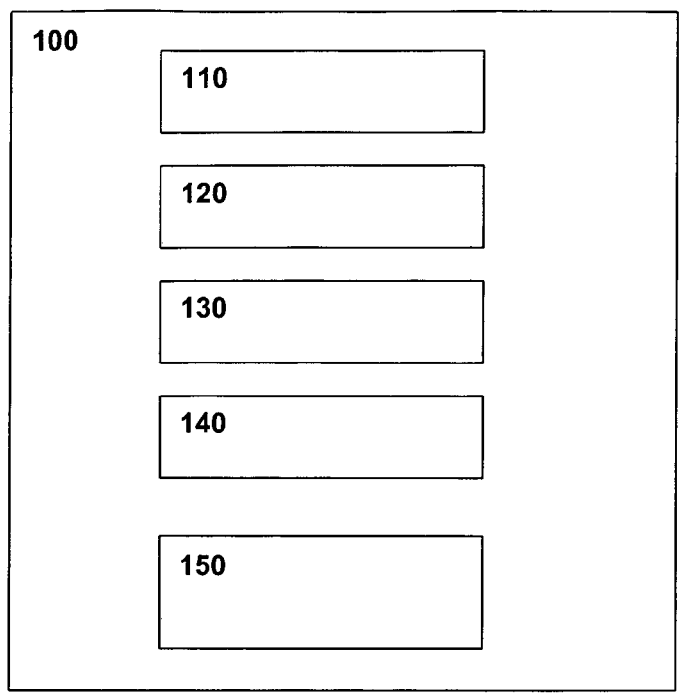
FIG. 3 shows in schematic form an example of inventive service usage information.

FIG. 3 shows in schematic form an example of service usage information (100) according to the invention. The service usage information (100) comprises a plurality of entries (110, 120, 130, 140), wherein a request event of a requested telecommunication service on the part of a telecommunication transmission device (20) on the telecommunication network (10) is associated with each of these entries (110, 120, 130, 140) (and, conversely, a corresponding entry of the service usage information (100) is associated with each such request event). In addition to the entries (110, 120, 130, 140), the service usage information (100) also comprises an aggregate entry (150), wherein the aggregate entry (150) relates to the entries (110, 120, 130, 140) of the service usage information (100) and wherein the aggregate entry (150) comprises aggregate information on each type of the plurality of different types of telecommunication services.

According to the invention, the entries (110, 120, 130, 140) for the service usage information (100) are generated in the telecommunication network (10) by the network elements (11) which are involved in the provision of the telecommunication services (of the telecommunication network (10)). Accordingly, corresponding entries for the other service usage information (300) are generated in the other telecommunication network (30) (see FIG. 2) by the network elements (31) which are involved in the provision of the telecommunication services (of the other telecommunication network (30)). This information, which is generated by the network elements (11) of the telecommunication network (10), is forwarded on to the aggregate entry generation systems (12) which are provided within the telecommunication network (10) for the billing of telecommunication services and which generate the service usage information (100). Accordingly, the information of the network elements (31) of the other telecommunication network (30) is forwarded on to the other aggregate entry generation systems (32) which are provided within the other telecommunication network (30) for the billing of telecommunication services and which generate the other service usage information (300).

If, for example, the following categories are used as possible telecommunication services:
(voice) call international,
(voice) call national,
SMS,
data transfer,
the aggregate entry (150) receives information on each such type of telecommunication service as aggregate information, particularly quantity information, which relates to the entries (110, 120, 130, 140), for example in the form of:

| (voice) call international | 365 minutes |
| (voice) call national, | 445 minutes |
| SMS, | 3110 SMS |
| data transfer | 8,943 MB | wherein the information provided on each type of telecommunication service or on each category of the aggregate individual quantities corresponds to the entries (110, 120, 130, 140).

According to the invention, it is thus advantageously possible for billing between the telecommunication network (10) and the other telecommunication network (30) to take place via a simple procedure.

Preferably, each of the entries (110, 120, 130, 140) includes specific information on a request event of a specific type of telecommunication service, with the aid of which charging information can be generated via a simple procedure, but which does not include any charging information, such as, for example:
the IMSI (International Mobile Subscriber Identity) of the calling subscriber, i.e. of the telecommunication transmission device (20),
the called number,
a time stamp as an indication of when the request event of the telecommunication service takes place,
the type of telecommunication service, particularly in the form of a coded statement, for example "TeleServiceCode=11" for "(voice) call national" or such like,
the scope of the requested telecommunication service, for example in the form of the duration of a telephone connection or in the form of the volume of data used.

The generation of the service usage information (100) (or of other service usage information (300) takes place according to the invention, in particular, shortly after the telecommunication service is provided to the telecommunication transmission device (20). Preferably, the exchange or the transfer of the service usage information (100) or of the other service usage information (300) between the telecommunication network (10) and the other telecommunication network (30) takes place at regular intervals, for example at least every 4 hours or every 6 hours or every 12 hours or every 24 hours. In this context, each of the entries (110, 120, 130, 140) which are contained in a file of service usage information (100) preferably relates to the previous period (of, for example, 4 hours or 6 hours or 12 hours or 24 hours).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating service usage information in a visited telecommunication network, the method comprising:
automatically generating, by the visited telecommunication network, service usage information, wherein automatically generating the service usage information comprises:
generating, by network elements of the visited telecommunication network that are involved in provision of telecommunication services, a plurality of entries of service usage information, wherein each entry of service usage information corresponds to a request from a telecommunication transmission device of a group of telecommunication transmission devices roaming in the visited telecommunication network, wherein the plurality of entries of service usage information include entries of service usage information corresponding to different types of telecommunication services provided by the visited telecommunication network, and wherein each entry of service usage information comprises a usage quantity corresponding to one type of service provided by the visited telecommunication network; and generating, by an aggregate entry generation system of the visited telecommunication network, an aggregate entry of service usage information based on the plurality of entries of service usage information, wherein the aggregate entry comprises aggregate usage quantity information corresponding to each type of the different types of telecommunication services provided by the visited telecommunication network, and wherein the aggregate entry does not include any charging information; and transmitting, by the visited telecommunication network, the generated aggregate entry of service usage information to a home telecommunication network of the group of telecommunication transmission devices.

2. The method according to claim 1, wherein the home telecommunication network of the group of telecommunication transmission devices is configured to process service usage information of the visited telecommunication network based on the transmitted aggregate entry of service usage information.

3. The method according to claim 1, wherein transmission of aggregate entries of service usage information, from the visited telecommunication network to the home telecommunication network of the group of telecommunication transmission devices, is performed at regular intervals.

4. A system, comprising:
a group of telecommunication transmission devices, roaming in a visited telecommunication network, the group of telecommunication transmission devices being configured to request a plurality of different types of telecommunication services provided by the visited telecommunication network; and the visited telecommunication network, wherein the visited telecommunication network comprises:
network elements, configured to be involved in provision of telecommunication services; and
an aggregate entry generation system, configured to be involved in billing for telecommunication services;

wherein the network elements are configured to generate a plurality of entries of service usage information, wherein each entry of service usage information corresponds to a request from a telecommunication transmission device of the group of telecommunication transmission devices, wherein the plurality of entries of service usage information include entries of service usage information corresponding to different types of telecommunication services provided by the visited telecommunication network, and wherein each entry of service usage information comprises a usage quantity corresponding to one type of service provided by the visited telecommunication network;

wherein the aggregate entry generation is configured to generate an aggregate entry of service usage information based on the plurality of entries of service usage information, wherein the aggregate entry comprises aggregate usage quantity information corresponding to each type of the different types of telecommunication services provided by the visited telecommunication network, and wherein the aggregate entry does not include any charging information; and wherein the visited telecommunication network is configured to transmit the generated aggregate entry of service usage information to a home telecommunication network of the group of telecommunication transmission devices.

5. A non-transitory, processor-readable medium, part of a programmable device or a network element of a telecommunication network, having processor-executable instructions for generating service usage information in the telecommunication network, the processor-executable instructions, when executed by a processor, facilitating the performance of following steps:

automatically generating, by the visited telecommunication network, service usage information, wherein automatically generating the service usage information comprises:

generating, by network elements of the visited telecommunication network that are involved in provision of telecommunication services, a plurality of entries of service usage information, wherein each entry of service usage information corresponds to a request from a telecommunication transmission device of a group of telecommunication transmission devices roaming in the visited telecommunication network, wherein the plurality of entries of service usage information include entries of service usage information corresponding to different types of telecommunication services provided by the visited telecommunication network, and wherein each entry of service usage information comprises a usage quantity corresponding to one type of service provided by the visited telecommunication network; and generating, by an aggregate entry generation system of the visited telecommunication network, an aggregate entry of service usage information based on the plurality of entries of service usage information, wherein the aggregate entry comprises aggregate usage quantity information corresponding to each type of the different types of telecommunication services provided by the visited telecommunication network, and wherein the aggregate entry does not include any charging information; and transmitting, by the visited telecommunication network, the generated aggregate entry of service usage information to a home telecommunication network of the group of telecommunication transmission devices.

* * * * *